United States Patent [19]

Takeuchi et al.

[11] Patent Number: 5,161,144
[45] Date of Patent: Nov. 3, 1992

[54] SYSTEM FOR RECORDING INFORMATION ON AN OPTICAL RECORDING MEDIUM

[75] Inventors: Ryoji Takeuchi; Tomohisa Yoshimaru, both of Yokohama; Akihiko Doi, Tokyo, all of Japan

[73] Assignee: Kabushiki Kaisha Toshiba, Kawasaki, Japan

[21] Appl. No.: 516,968

[22] Filed: Apr. 27, 1990

[30] Foreign Application Priority Data

Apr. 28, 1989 [JP] Japan .................. 1-110105
Apr. 28, 1989 [JP] Japan .................. 1-110106

[51] Int. Cl.$^5$ .............................................. G11B 7/00
[52] U.S. Cl. ...................................... 369/54; 369/48
[58] Field of Search ............... 369/116, 54, 58, 48, 369/32, 111; 360/68

[56] References Cited

U.S. PATENT DOCUMENTS

| | | | |
|---|---|---|---|
| 4,308,612 | 12/1981 | Miyauchi et al. | 369/48 |
| 4,546,462 | 10/1985 | Kaishi et al. | 369/58 |
| 4,831,611 | 5/1989 | Sasaki et al. | 369/54 |

OTHER PUBLICATIONS

Patent Abstracts of Japan, unexamined applications, P. Field, vol. 11, No. 109, Apr. 7, 1987–The Patent Office Japanese Government (p. 115 P 564)-Kokai-no. 61-258 335 (Toshiba Corp.).
Patent Abstracts of Japan, unexamined applications, P Field, vol. 12, No. 46, Feb. 12, 1988–The Patent Office Japanese Government (p. 112 P 665)-Kokai-No. 62-192 938 (Canon Inc.).
EP-A2-0 289 304 (Sharp K. K.) FIG. 1; abstract.

Primary Examiner—Roy N. Envall, Jr.
Assistant Examiner—Nabil Hindi
Attorney, Agent, or Firm—Finnegan, Henderson, Farabow, Garrett and Dunner

[57] ABSTRACT

In an information recording system, a semiconductor laser is energized in response to a drive current which is modulated in accordance with a recording signal in a recording mode so that a modulated laser beam is generated from the semiconductor laser. The modulated laser beam is focused on an optical disk and is reflected from the optical disk and the reflected laser beam is detected by an photo-detector. A detection signal from the detector is compared with a predetermined threshold level by a binary circuit and a relationship between the recording signal and an output signal from the binary circuit is detected by a detection circuit. In a overwrite mode in which the laser beam is focused on a pit or pits on the optical disk, an overwrite detection signal is generated from the detection circuit and the overwrite detection signal is counted by a counter circuit. When the counter circuit counts a predetermined count value, the counter circuit generates a recording inhibition signal for preventing the semiconductor laser from generating the modulated laser beam.

9 Claims, 7 Drawing Sheets

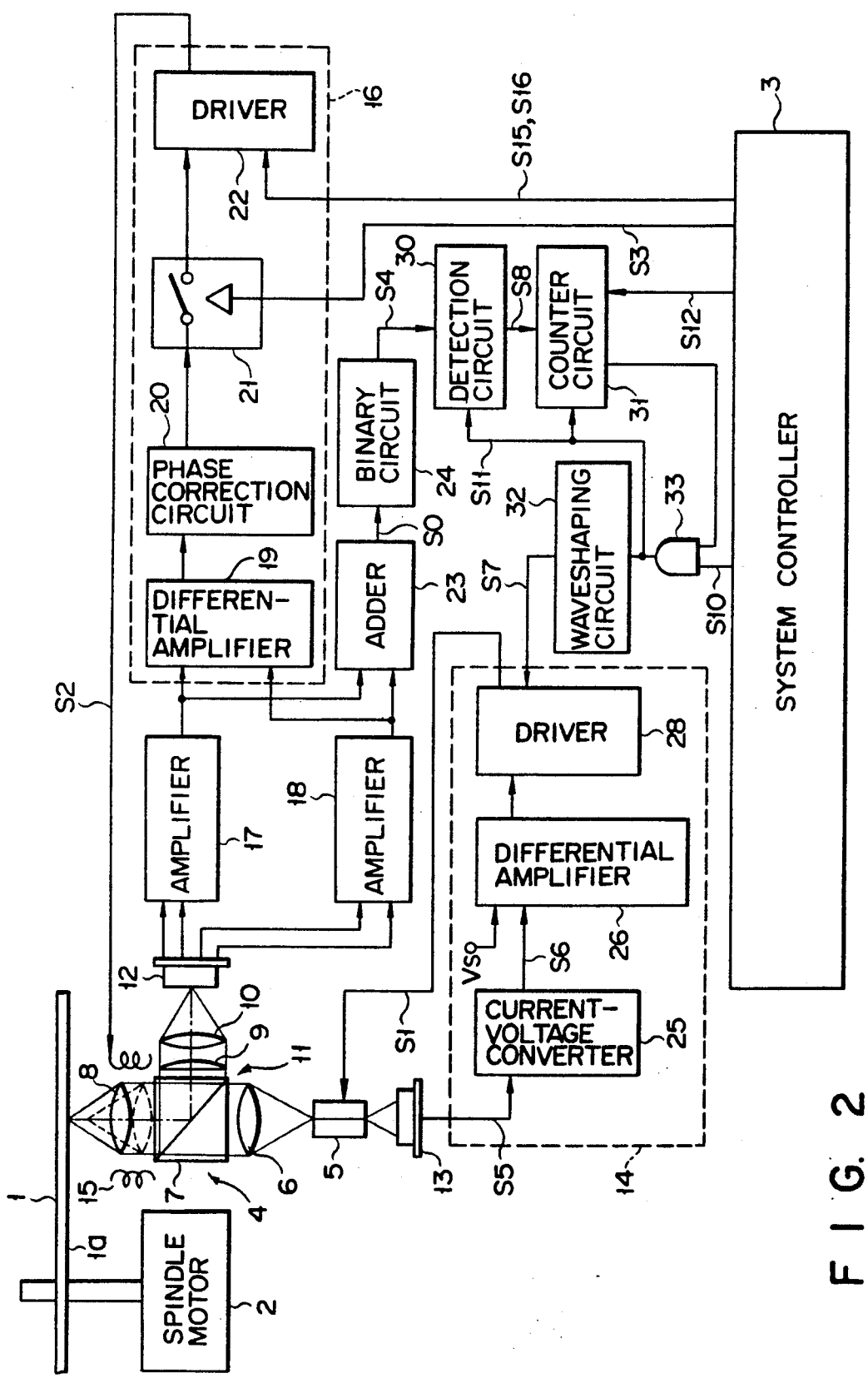
F I G. 2

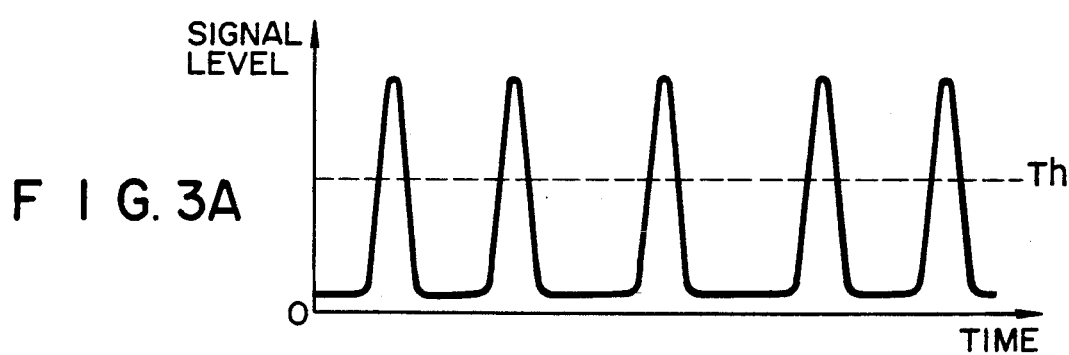
F I G. 3A
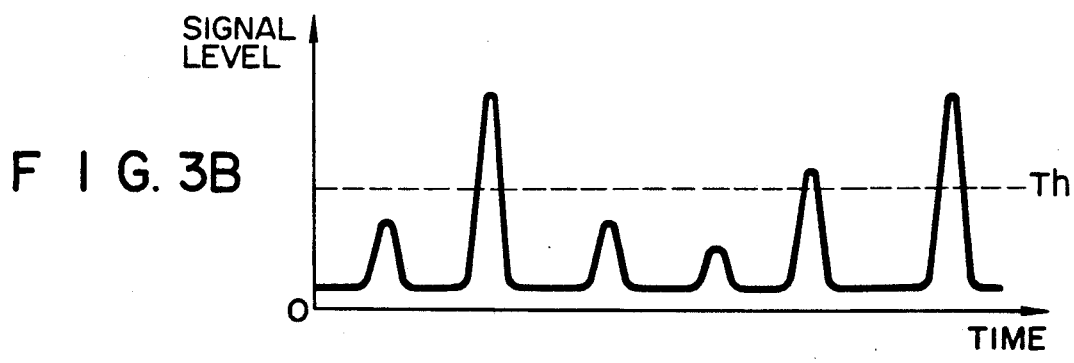
F I G. 3B

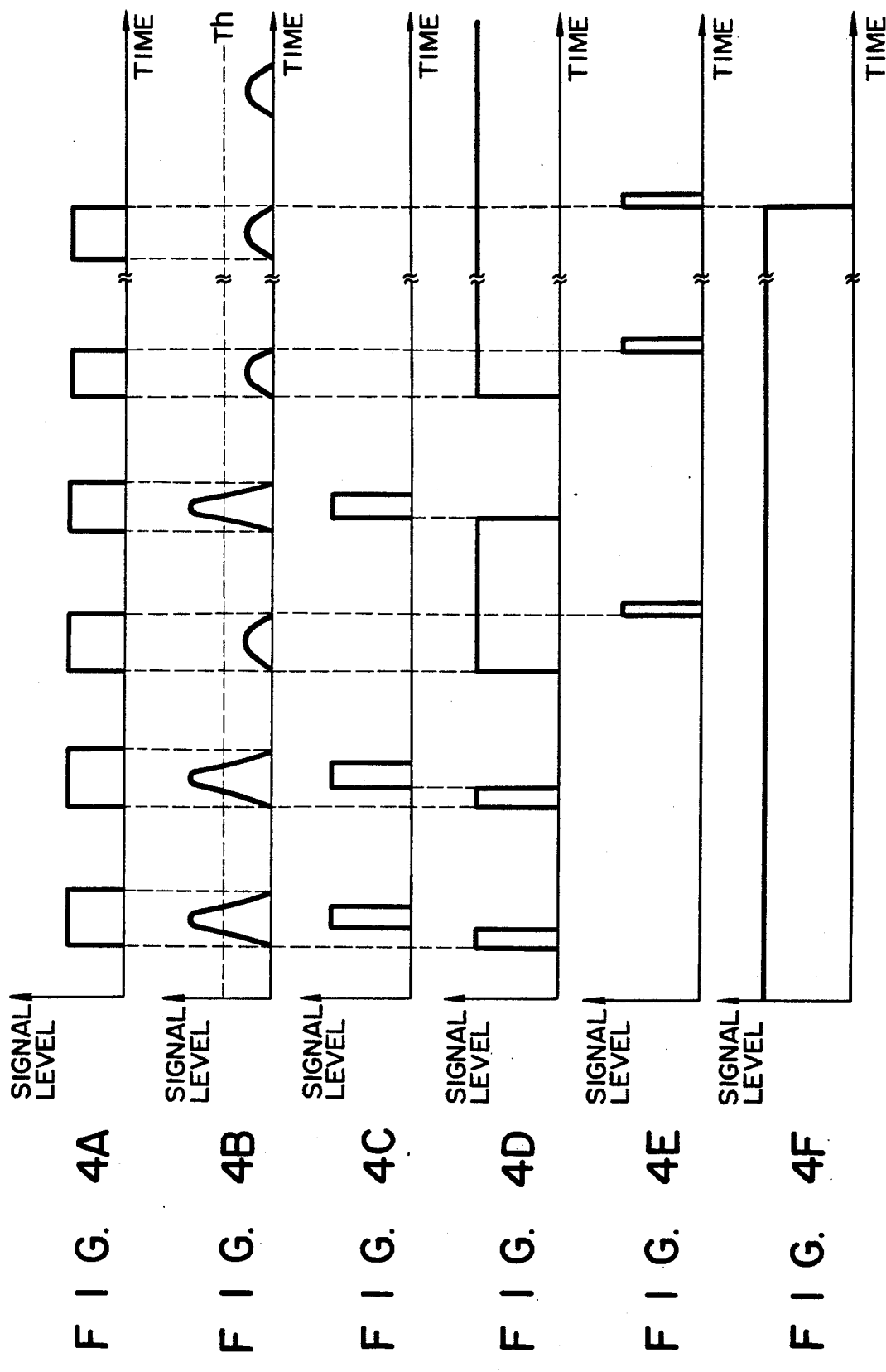

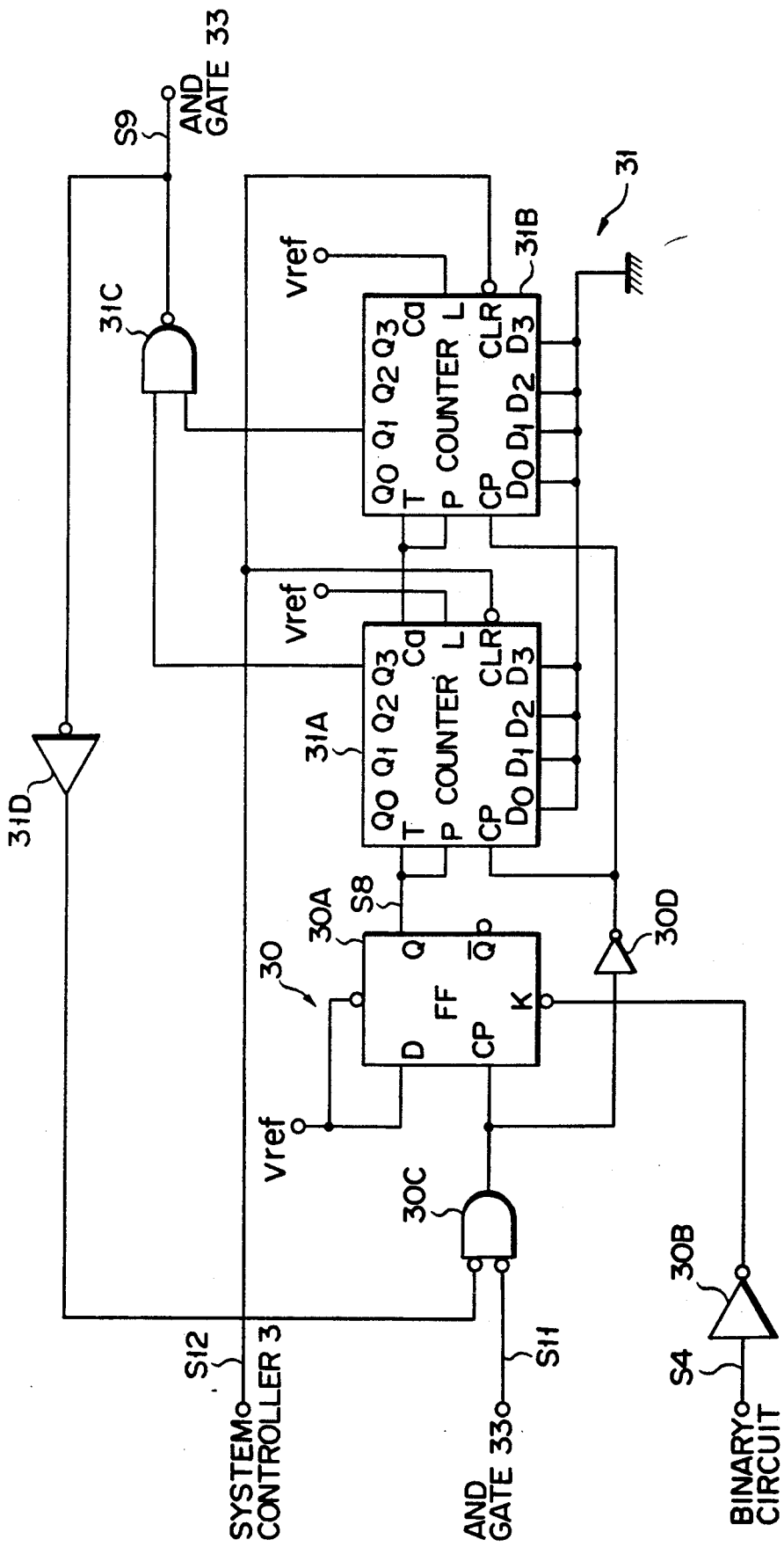
F I G. 5

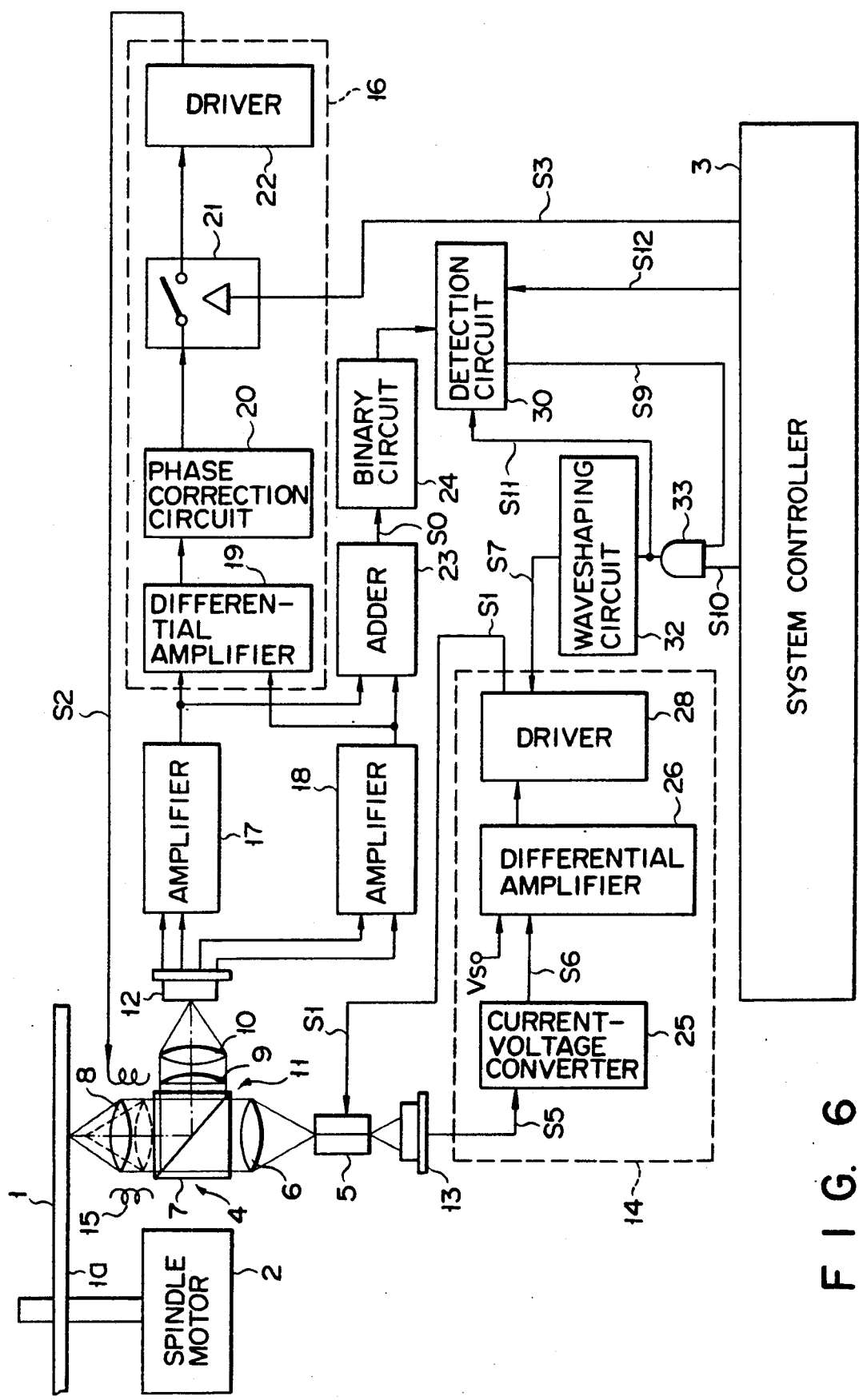
F I G. 6

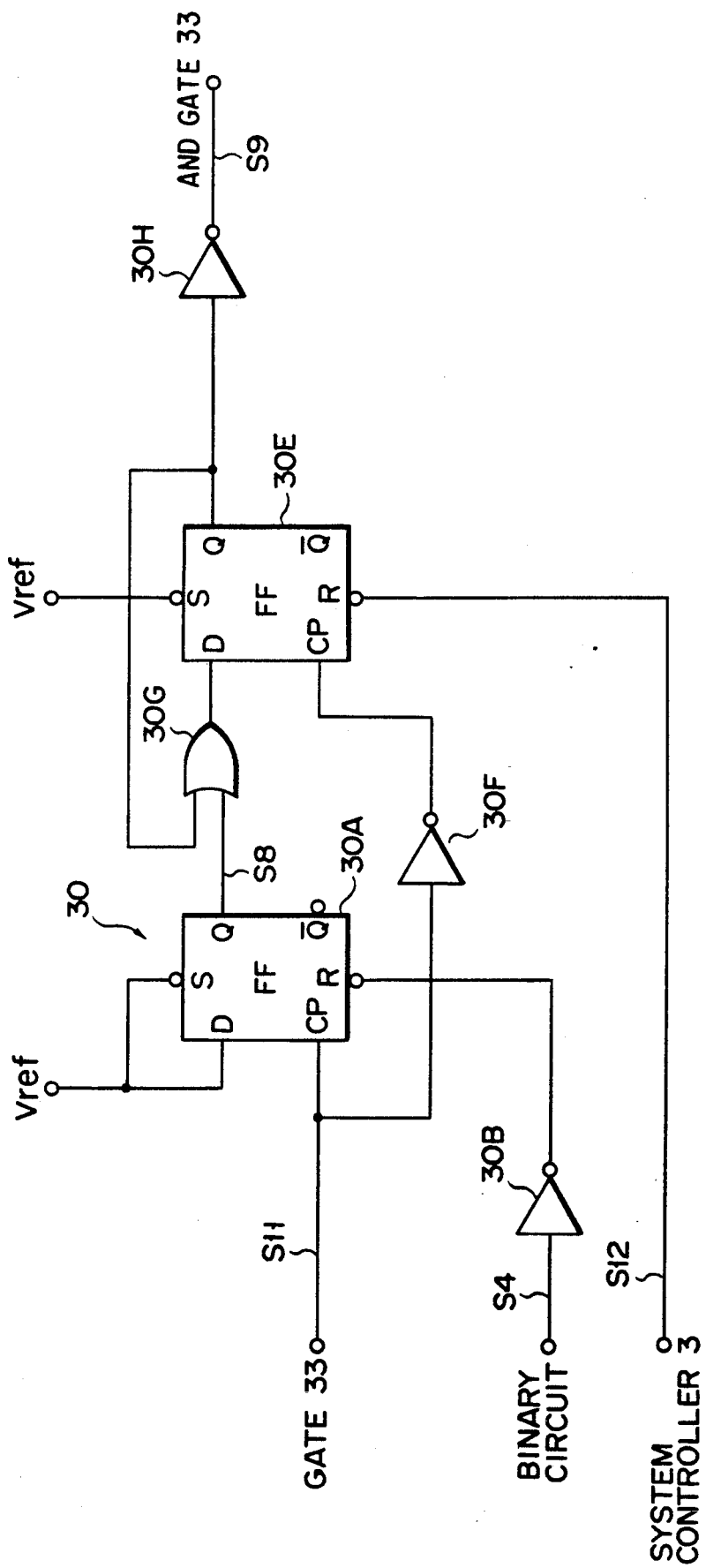
F I G. 7

SYSTEM FOR RECORDING INFORMATION ON AN OPTICAL RECORDING MEDIUM

BACKGROUND OF THE INVENTION

1. Field of the Invention

The present invention relates to an information recording system for recording information on an optical information recording medium and, more particularly, to an information recording system which can prevent overwrite in an area of an information recording medium on which information has been already recorded.

2. Description of the Related Art

In a conventional information recording system such as an optical disk system for optically recording or retrieving information in or from an optical information recording medium such as a write once or erasable optical disk, a retrieving light beam having a relatively low predetermined level is continuously generated from a semiconductor laser serving as a light source when the system is in a retrieval mode, and the information on the optical disk is retrieved by the retrieving light beam. When the system is a recording mode, a pulsating recording light beam having a relatively high predetermined reference level is generated. The level is intermittently changed in accordance with information to be recorded. Information is then recorded on the optical disk by the recording light beam. In such an information recording system, when a light beam having a level higher than the predetermined reference level is radiated on a recording area of the optical disk, indeterminate information may often be written in the optical disk and destroy the information which was previously written, even if there was no intention to record in that area.

A technique for preventing such destruction of information already written in an optical disk is disclosed in, e.g., Japanese Patent Disclosure (Kokai) No 61-258335. In this system, as will be explained below and as is understood from the waveforms shown in FIGS. 1A, 1B, and 1C, when a pit on the recording medium, i.e., information, is detected by the system when it is in the recording mode, it is determined that overwriting may occur, and the recording operation is interrupted.

FIG. 1A shows a waveform of a light beam reflected from an optical disk which is detected when the system is in a retrieval mode. As is apparent from FIG. 1A, a light beam having a relatively low level is reflected from the optical disk, and low-level components are generated in the retrieving light beam as dark components corresponding to pits on the optical disk. These components are converted into significant data by a processing circuit including a detector.

FIG. 1B shows a waveform of a light beam reflected from the optical disk obtained when information, i.e., data, is being normally recorded in the optical disk, i.e., when data is recorded in a non-recorded area. As is apparent from FIG. 1B, a relatively high-level pulsative waveform corresponding to the recorded data is detected.

FIG. 1C shows a waveform of a light beam reflected from the optical disk when data is overwritten in the optical disk, i.e., when data is being recorded in an area in which data has been already recorded. As shown in FIG. 1C, a light beam with a waveform obtained by superposing the waveform of a reflected light beam in the normal recording mode shown in FIG. 1B onto the waveform of the reflected light beam in the retrieval mode shown in FIG. 1A is generated upon overwriting.

In a conventional system, when the waveform of the reflected light beam shown in FIG. 1C is compared with a predetermined threshold level Th which is sufficiently lower than the intensity of the retrieving light beam, and a pit, i.e., a dark component, is detected, it is determined that overwriting has occurred. In other words, it is determined whether an area in which data is being recorded is a non-recorded area or a recorded area in accordance with whether a signal in the recording mode includes a signal corresponding to a pit, thus preventing overwrite.

A signal in the recording mode, in particular, a low-level signal component, is, however, adversely affected by, e.g., undershooting of a signal representing a recording beam intensity. The undershooting may cause the signal as shown in FIG. 1D, to fall below the threshold level Th erroneously, resulting in improper stopping of the recording operation. In addition, a detection error or omission may occur, and overwrite cannot be reliably prevented.

SUMMARY OF THE INVENTION

It is an object of the present invention to provide an information recording system for recording information in an information recording medium, and preventing a detection error or a failure to reliably prevent overwrite.

According to the present invention, there is provided a recording information system comprising:

recording signal generating means for generating a signal to be recorded;

optical means for generating a recording light beam modulated in response to the recording signal, and guiding the recording light beam to the optical recording medium;

means for detecting a reflected light beam from the optical recording medium and converting the reflected light beam into an electrical signal;

comparing means for comparing the level of the electrical signal from the converting means with a predetermined level to generate a comparison signal if the level of the electrical signal exceeds the predetermined level;

detecting means for detecting the absence of the comparison signal and generating a recording inhibition signal in response to the absence; and inhibiting means for inhibiting supply of the recording signal to the optical means in response to the recording inhibition signal.

There is further provided a system for optically recording information in an optical recording medium, comprising:

recording signal generating means for generating a signal to be recorded;

optical means for generating a recording light beam modulated in response to the recording signal and having a high intensity level, and guiding the recording light beam to the optical recording medium;

means for detecting a reflected light beam from the optical recording medium and converting the reflected light beam into an electrical signal having a high level which corresponds to the high intensity level of the recording beam;

comparing means for comparing the level of the electric signal from the converting means with a predetermined level which is set within a range of 2.5/3 to 1.5/3 times of the high level to generate an inhibiting signal if the level of the electrical signal exceeds the predetermined level; and inhibiting means for inhibiting supply of the recording signal to the optical means in response to the recording inhibition signal.

According to the present invention, overwrite is detected utilizing the fact that the intensity of a recording light beam output from an optical means and reflected from a recorded area of the optical recording medium is different from the intensity of a similar beam reflected from a non-recorded area. When a recording light beam modulated by the optical means is directed to the recording medium, the level of the light beam reflected from the recording medium is compared with a predetermined level. When a reflected light beam having a level below the predetermined level is detected by the detecting means, it is determined that a given area is a recorded area, and a recording inhibition signal is output to stop the recording operation.

In addition, a signal level below the predetermined level is counted by a counting means. When the count value exceeds a predetermined value, it is determined that a given area is a recorded area, and a recording inhibition signal is output to stop a recording operation.

According to the system of the present invention, since the intensity of the reflected light beam is detected, overwrite can be stably detected. In addition, because the system can determine overwrite after a plurality of reflected light beams having levels below the predetermined level are detected, overwrite can be prevented more reliably.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a schematic arrangement of an optical disk system according to an embodiment of the present invention;

FIG. 3A shows a waveform of a recording light beam reflected from the optical disk in the normal recording mode;

FIG. 3B shows a waveform of a recording light beam reflected from the optical disk in the overwrite recording mode;

FIG. 4A is a waveform chart showing a recording signal output from a system controller shown in FIG. 2;

FIG. 4B is a waveform chart showing a signal from an adder and corresponding to a recording light beam reflected from the optical disk shown in FIG. 2;

FIG. 4C is a waveform chart showing a binary signal output from a binary circuit shown in FIG. 1;

FIG. 4D is a waveform chart showing a detection signal output from a detection circuit shown in FIG. 2;

FIG. 4E is a waveform chart showing a count signal generated in a counter circuit shown in FIG. 2;

FIG. 4F is a waveform chart showing write permission and inhibition signals output from the counter circuit shown in FIG. 2;

FIG. 5 is a block diagram showing a detection circuit and a counter circuit shown in FIG. 2;

FIG. 6 is a block diagram showing a schematic arrangement of an optical disk system according to an another embodiment of the present invention; and FIG. 7 is a block diagram showing a detection circuit shown in FIG. 6.

DETAILED DESCRIPTION OF THE PREFERRED EMBODIMENTS

Figure 1A:
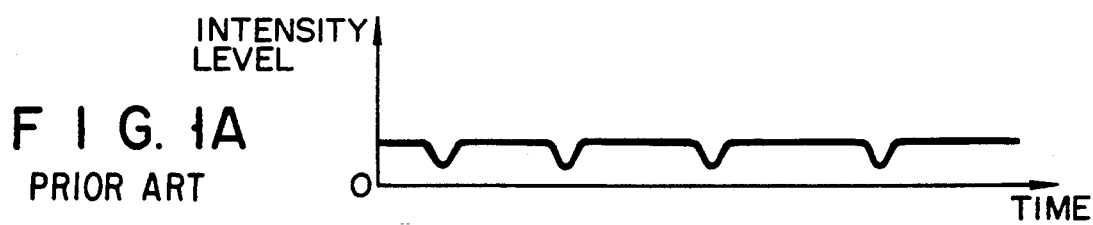
FIGS. 1A, 1B, and 1C respectively show waveforms of light beams reflected from a conventional optical disk in a retrieval mode, a normal recording mode, and an overwrite recording mode.
Figure 1B:
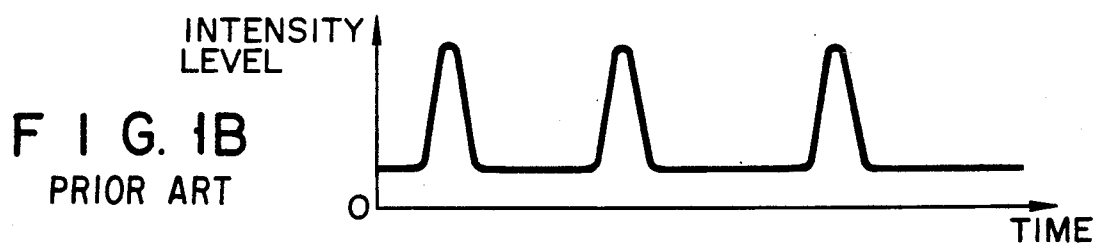
Figure 1C:
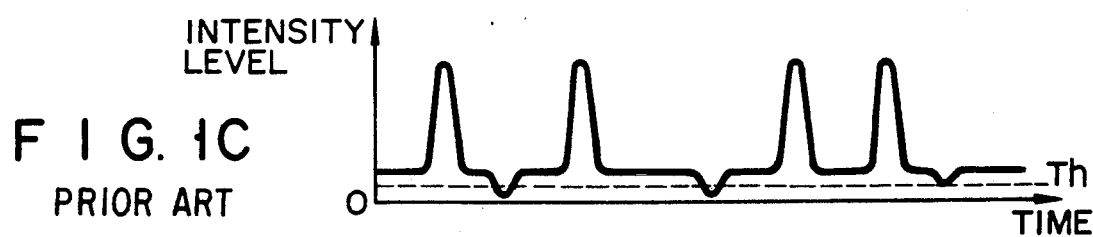
Figure 1D:
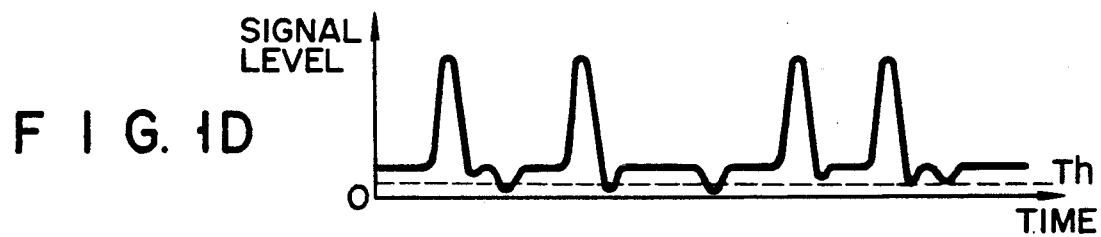
FIG. 1D shows an electric signal corresponding to the intensity level of the light beam shown in FIG. 1C.

FIG. 2 shows a schematic arrangement of an optical disk system serving as an information recording system according to the present invention. Referring to FIG. 2, an optical information recording medium, i.e., an optical disk 1, is formed by coating a metal coating layer made of, e.g., tellurium or bismuth on the surface of a circular substrate of, e.g., a glass or plastic to have a doughnut-like shape. The optical disk 1 is rotated by a spindle motor 2. The start, stop and speed of rotation of the spindle motor 2 are controlled by a motor controller (not shown) operated in response to a control signal from a system controller 3. The system controller 3 includes, e.g., a microcomputer, and controls the rotation of the spindle motor 2.

An optical head 4 is disposed below the optical disk 1. A light beam is focused on the optical disk 1 by the optical head 4, and data is optically recorded in or retrieved from the optical disk 1. The optical head 4 includes a known astigmatism optical system 11 having a semiconductor laser 5, a collimator lens 6, a polarization beam splitter 7, an objective lens 8, a cylindrical lens 9, and a convex lens 10, and photodetectors 12 and 13 each having four-divided detection areas. The optical head 4 is disposed to be movable in the radial direction of the optical disk 1 by a linear actuator (not shown) consisting of, e.g., a linear motor, and is moved by the linear actuator to trace a target track which is a target for recording or retrieval by a light beam in response to an instruction from the controller 3.

The semiconductor laser 5 is energized in response to a drive signal S1 output from a light beam control circuit 14 to generate a divergent laser beam. When information is recorded on a recording film 1a of the optical disk 1, the drive signal S1 is modulated in correspondence with the information to be recorded. The semiconductor laser 5, therefore, generates an intense laser light beam having a modulated light intensity in accordance with the information to be recorded. When the information is read out from the recording film 1a of the optical disk 1, and is retrieved, a weak laser beam having a constant light intensity is generated from the semiconductor laser 5.

The divergent laser light beam generated from the semiconductor laser 5 is converted into a parallel light beam by the collimator lens 6, and is guided to the polarization beam splitter 7. The laser beam guided to the polarization beam splitter 7 is transmitted through the polarization beam splitter 7, and is incident on the objective lens 8. The incident beam is focused on the recording film 1a of the optical disk 1 by the objective lens 8.

The objective lens 8 is supported by a lens actuator 15 serving as a lens drive mechanism to be movable along a direction of the optical axis. The objective lens 8 is moved along the direction of the optical axis in response to a servo signal S2 from a focus servo circuit 16 to be kept in an in-focus state. When the objective lens 8 is kept in the in-focus state, a laser light beam from the objective lens 8 is focused on the surface of the recording film 1a of the optical disk 1, and a minimum beam spot is formed on the surface of the recording film 1a of the optical disk 1.

The objective lens 8 is supported by the lens actuator 15 to be also movable along a direction perpendicular to the optical axis. The objective lens 8 is moved along the direction perpendicular to the optical axis in response to a servo signal from a tracking servo circuit (not shown), and is kept in the in-track state. In this in-track state, a light beam focused on the surface of the recording film 1a of the optical disk 1 from the objective lens 8 traces a recording track formed on the surface of the recording film 1a of the optical disk 1. The objective lens 8 is kept at an infocus point and in the in-track state, and information can be written in or read out from the optical disk 1.

A divergent laser beam reflected from the recording film 1a of the optical disk 1 is converted into a parallel beam by the objective lens 8 in the in-focus state, and is returned to the polarization beam splitter 7. The beam is reflected by the polarization beam splitter 7, and is guided to the photodetector 12 having the four-divided detection areas by the astigmatism optical system 11 including the cylindrical and convex lenses 9 and 10. The shape of a light beam spot formed on the detector 12 by a light beam is changed in accordance with a defocus state. Two pairs of signals output from two photodetection areas diagonally located in the photodetector 12 are supplied to amplifiers 17 and 18, respectively.

The focus servo circuit 16 includes a differential amplifier 19 for receiving and differentially amplifying the two signals respectively amplified by the amplifiers 17 and 18, a phase correction circuit 20 for correcting the phase of an output signal from the differential amplifier 19, an analog switch 21 for controlling whether an output signal from the phase correction circuit 20 is supplied to a driver 22, and the driver 22 for amplifying a signal from the analog switch 21 to drive the actuator 15. When the analog switch 21 is turned on in response to a focus-on signal S3 from the system controller 3, a signal from the phase correction circuit 20 is supplied to the actuator 15 through the driver 22, thus operating a focus servo loop.

In addition, the output signals from the amplifiers 17 and 18 are also supplied to an adder 23, and are added to each other. The adder 23 outputs a sum signal so having a signal level corresponding to the data retrieved from or recorded in the optical disk 1. More specifically, in a retrieval mode, a sum signal including a low-level component shown in the waveform in FIG. 1A is output from the adder 23. In a recording mode, the optical disk 1 is irradiated with the recording light beam having a low intensity substantially the same as that of the retrieving light beam and a high intensity which is ten to thirty times of that of the retrieving light beam, in general, twenty times of that of the retrieving light beam, i.e., the recording light beam having the low level of 0.5 mW and the high level of 10 mW. Thus, the pit or pits are formed on the optical disk 1 to record data. In a normal recording mode, i.e., when data is recorded in a non-recorded area on the optical disk, a sum signal having a same waveform as that of the recording light beam which is reflected from the optical disk 1 is output from the adder 23, as shown in FIG. 3A. In contrast, in an overwrite recording mode, i.e., when data is further recorded in an area in which data has already been recorded, a sum signal which is different with the recording light beam is output from the adder 23, as shown in FIG. 3B. The sum signal from the adder 23 has a waveform which is not coincided with that of the recording light beam and includes an intermediate level component which does not appear in the recording light beam. More specifically, when the recording light beam is focused on a recorded area in which the pit or pits have been already formed, the light beam is diffracted by the pit. As a result, the light intensity of the light beam reflected from the pit is reduced, and the light beam is converted into an intermediate level component smaller than the high-level component, and larger than the low-level component. The intermediate level component has a level which is within a range of $\frac{1}{4}$ to $\frac{3}{4}$ times of the high-level component, in general, $\frac{1}{2}$ times of the high-level component.

The output signal from the adder 23 is transmitted to a binary circuit 24. The binary circuit 24 includes a comparator. When the analog signal output from the adder 23 is compared with a predetermined threshold level Th, the output of circuit 24 is binary. The threshold level Th is set to have a level which is within a range of 1.5 to 2.5 times of the intermediate level, i.e., a range of 2.5/3 to 1.5/3 times of the high level, preferably, a range of 0.8 to 0.5 times of the high level. The binary signal S4 output by the binary circuit 24 is supplied to a detection circuit 30.

The detection circuit 30 receives recording data S11 shown in FIG. 4A output from the system controller 3 through an AND gate 33, and the binary signal S4 shown in FIG. 4C output from the binary circuit 24. In an overwrite situation mode, an overwrite detection signal S8 is generated. More specifically, if the optical disk 1 in which data is to be recorded is a non-recorded disk, the binary signal is output from the binary circuit 24 in correspondence with the recording data S11 or S10. The detection circuit 30, therefore, checks whether the recording data S11 has a one-to-one correspondence with the binary signal S4 from the binary circuit 24. When a binary signal S4 corresponding to the recording data S11 is not generated, the overwrite detection signal S8 is generated from the detection circuit 30. As shown in FIG. 5, the detection circuit 30 includes a flip-flop 30A, a NOR gate 30C, and an inverter 30B. As will be described later, the overwrite detection signal S8 is output from the Q output terminal of the flip-flop 30A in accordance with the binary signal S4 from the binary circuit 24 and the recording data S10 from the system controller 3. The overwrite detection signal S8 from the detection circuit 30 is supplied to a counter circuit 31.

The counter circuit 31 counts the number of detected overwrites in response to the overwrite detection signal S8 output from the detection circuit 30. When the count reaches a predetermined number, i.e., 40, a recording inhibition signal S9 is output to inhibit the recording operation. As shown in FIG. 5, the counter circuit 31 includes counters 31A and 31B, a NAND gate 31C, and an inverter 31D, as will be described later. The pulses of the recording data S10 are counted while the overwrite detection signal is kept at a high level. When the count reaches a predetermined number, a low-level recording inhibition signal S9 is output from the NAND gate 31C in response to the high-level signals output from the counters 31A and 31B. The counter circuit 31 is arranged such that the recording inhibition signal S9 is output from the counter circuit 31 only when it is detected that the count has reached the predetermined count. The counter circuit 31 is arranged in this manner because if the optical disk 1 has a defect in which the reflective film is partially removed from the beginning, e.g., a pin hole is formed, the overwrite detection signal S8 may be output even if data is recorded in a non-recorded area, thus causing a erroneous indication of overwrite. The predetermined count value is determined as follows. The upper limit of the predetermined count value is restricted in accordance with the error correction capability of the system. This is because the recording operation must be stopped while the data destroyed by overwriting can be corrected by an error correction circuit (not shown). On the other hand, the lower limit of the predetermined count value is determined in accordance with an allowance range of defects such as pin holes on the optical disk 1. More specifically, when data is recorded on a defective portion of the optical disk 1, output of the overwrite detection signal S8 is continued. If the recording inhibition signal S9 is output prior to passing through the defective portion, however, the defective portion is erroneously detected, and it is determined that an overwrite has occurred. Therefore, the predetermined count value must be determined to be a value larger than the minimum allowance count value. The recording inhibition signal S9 from the counter circuit 31 is supplied to an AND gate 33. Note that when a clear signal S12 is output from the system controller 3, the counter circuit 31 is reset.

The AND gate 33 receives the recording data S10 supplied from an external unit (not shown) through the system controller 3 as one input, and receives the recording inhibition signal S9 output from the counter circuit 31 as the other input. The recording data is, therefore, output from the AND gate 33 while the counter circuit 31 generates a low-level permission signal, and the output of the recording data S11 from the AND gate 33 is inhibited while the counter circuit 31 generates a high-level inhibition signal. The recording data S11 is supplied to a waveshaping circuit 32, the detection circuit 30, and the counter circuit 31. The waveshaping circuit 32 shapes the recording data S11, and the shaped recording signal is supplied to a driver 28 (to be described later).

In the semiconductor laser 5, the photodetector 13 consisting of a photoelectric conversion element such as a photodiode is arranged to face a light emission point, at which a monitor light beam is emitted, which is opposite to a light emission point at which a recording or retrieval laser beam is emitted. A monitor light beam from the semiconductor laser 5 is guided to the photodetector 13. The monitor light beam is converted into an electrical signal by the photodetector 13. This electrical signal is supplied to the light beam control circuit 14 as a light beam monitor signal S5 from the semiconductor laser 5.

The light beam control circuit 14 receives the light beam monitor signal S5 output from the semiconductor laser 5. Feedback control is performed to maintain the light beam from the semiconductor laser 5 at a constant intensity. More specifically, a currentvoltage converter 25 receives the monitor signal S5 photoelectrically converted by the photodetector 13 and extracted as a current signal. This monitor signal is converted into a voltage signal S6 corresponding to the light intensity received by the photodetector 13, i.e., the light beam from the semiconductor laser 5, and the converted signal is output. The voltage signal S6 output from the current-voltage converter 25 is supplied to a differential amplifier 26.

The differential amplifier 26 receives the voltage signal S6 as one input, and receives a reference voltage Vs output from a constant voltage power source (not shown) as the other input. These voltages S6 and Vs are compared with each other, a difference therebetween is amplified, and the amplified difference is output as an error signal. The reference voltage Vs is a constant voltage to obtain a light beam required for retrieval. When feedback control is performed such that the voltage signal S6 approaches the reference voltage Vs, a constant light beam is output from the semiconductor laser 5. The error signal from the differential amplifier 26 is supplied to the driver 28.

The driver 28 receives a recording pulse signal S7 in accordance with information to be recorded from the above-mentioned waveshaping circuit 32. Therefore, a light beam modulated for a recording operation is output from the semiconductor laser 5. Note that, in the retrieval mode, the driver 28 receives a voltage signal output from the differential amplifier 26. In the recording mode, the driver 28 receives a voltage signal input in the retrieval mode which is set immediately before a recording operation, and held by a sample hold circuit (not shown). These two inputs are switched depending on whether the recording or retrieval mode is set. Regardless of the mode, feedback control is performed at the level of the light beam in the retrieval mode.

Operation of the system to present overwrite when the system is in the recording mode will be described hereinafter with reference to a timing chart shown in FIGS. 4A to 4F.

Prior to a recording operation, an initial operation is performed to check the level of the light beam emitted from the semiconductor laser 5. More specifically, when the focus-off signal S3 is output from the system controller 3, the analog switch 21 is turned off. Therefore, the focus servo loop is disconnected, and the objective lens 8 is released from focusing control. Then, a backward movement signal S15 is supplied from the system controller 3 to the lens actuator 15 through the driver 22 to forcibly move the actuator 15. The objective lens 8 is, therefore, forcibly moved to a position represented by a dotted line in FIG. 2, and is kept in a defocus state. In this defocus state, power is supplied to the light beam control circuit 14, the semiconductor laser 5 is energized, and the retrieval and monitor laser beams are output from the semiconductor laser 5. The monitor light beam generated from the semiconductor laser 5 is, therefore, converted into a current corresponding to the light beam by the photodetector 13, and is output as the light beam monitor signal S5. The current-voltage converter 25 converts the light beam monitor signal S5 into the voltage signal S6, and the voltage signal S6 is supplied to the differential amplifier 26. In the differential amplifier 26, the reference voltage Vs which is set in advance is compared with the voltage signal S6, and a difference therebetween is output as an error signal. The driver 28 is operated in response to this error signal. A drive signal is supplied from the driver 28 to the semiconductor laser to decrease the light beam from the semiconductor laser 5 if "voltage signal S6 > reference signal Vs", and to increase the light beam from the semiconductor laser 5 if "voltage signal S6 < reference signal Vs". When this error signal is supplied to the driver 28, a feedback loop is formed to perform control such that the reference voltage Vs is equal to the voltage signal S6. Therefore, the light beam from the semiconductor laser 5 can be kept at a constant level.

When a forward movement signal S16 is output from the system controller 3, the actuator 15 is driven by the driver 22, and the objective lens 8 is moved toward the position of an in-focus point. When the objective lens is moved near the in-focus point, the analog switch 21 is turned on, and the focus servo loop is connected, thus completing the initial operation. After the initial operation is completed, auto focus control is performed by the focus servo loop, and the objective lens is kept in the in-focus state. While the objective lens is kept in the in-focus state, data is read out from or written in the optical disk 1, i.e., a normal operation is started.

In such a state, as shown in FIG. 4A, an output of the pulsating recording data S10 from the system controller 3 is started. When this recording mode is started, the clear signal S12 is supplied from the system controller 3, so that the recording permission signal S9 output from the counter circuit 31 is initialized at high level. More specifically, a high-level clear signal is input from the system controller 3 to the input terminals CLR of the counters 31A and 31B shown in FIG. 5, and the counters 31A and 31B are cleared. At this time, the output S9 from the NAND gate 31C is kept at high level, and an output obtained by inverting the signal S9 by the inverter 31D is input to the NOR gate 30C. The recording signal S11 shown in FIG. 4B is, therefore, input to the input terminal CP of the flip-flop 30A, and the input terminals T and P of the counters 31A and 31B through the NOR gate 30C. The flip-flop 30A is set at a leading edge of the recording signal shown in FIG. 4B, and is reset at a leading edge of the binary signal shown in FIG. 4C supplied through the inverter 30B. Therefore, the signal S8 having a waveform shown in FIG. 4D is output from the output terminal Q of the flip-flop 30A. The counters 31A and 31B detect the level of the signal S8 from the output terminal Q of the flip-flop 30A, and generate a count pulse when the signal S8 is set at high level. In the normal recording mode in which information is recorded in an area without a pit, therefore, the count pulse is not generated and the counters 31A and 31B are not counted up.

In the normal mode, this high-level signal is input to the AND gate 33. The recording data S10 is, therefore, supplied to the waveshaping circuit 32 through the AND gate 33, and is also supplied to the driver 28. Therefore, the semiconductor laser 5 intermittently emits a high-intensity laser light beam corresponding to the recording data S10. This laser light beam is converted into a parallel light beam by the collimator lens 6, and is guided to the polarization beam splitter 7. The laser beam guided to the polarization beam splitter 7 is transmitted through the polarization beam splitter 7, and is incident on the objective lens 8. The incident light beam is focused on the recording film 1a of the optical disk 1 by the objective lens 8. Therefore, a pit is formed on the recording film 1a, and information is recorded.

The divergent laser light beam reflected from the recording film 1a of the optical disk 1 is converted into a parallel light beam by the objective lens 8 kept in the in-focus state, and is returned to the polarization beam splitter 7. The returned beam is reflected by the polarization beam splitter 7, and an image is formed on the photodetector 12 by the astigmatism optical system 11 constituted by the cylindrical and convex lenses 9 and 10. At this time, if the area of the optical disk 1 in which information is written is a recorded area, a reflected light waveform having a decreased light intensity level is generated, as shown in FIG. 4B. The signals photoelectrically converted by the photodetector 12 are supplied to the amplifiers 17 and 18, respectively. One of the signals amplified by the amplifiers 17 and 18 is supplied to the focus servo circuit 16 including the differential amplifier 19, and focusing control is performed. The other of the signals amplified by the amplifiers 17 and 18 is supplied to the adder 23, and is added. Thereafter, the obtained signal is supplied to the binary circuit 24.

As shown in FIGS. 3B and 4B, when the signal from the adder 23 is compared with the predetermined threshold level Th, the binary circuit 24 outputs the binary reflection light signal S4 shown in FIG. 4C. At this time, a laser light beam radiated on the pit which has been already formed does not appear in the signal S4 because the reflection light beam is small, as shown in FIG. 4B. The reflection light signal S4 is supplied to the detection circuit 30.

As shown in FIG. 5, in the detection circuit 30, an output from the binary circuit 24 is inverted by the inverter 30B, and is input to the input terminal K of the flip-flop 30A. In addition, the recording signal is input to the flip-flop 30A through the NAND gate 30C. The flip-flop 30A is, therefore, set at the leading edge of the recording signal, and is reset at the leading edge of the binary signal S4, as shown in FIG. 4D. As shown in FIG. 4C, the output of the binary signal S4 is slightly delayed from an output of the recording signal supplied through the NOR gate 30C.

As has been described above, in the normal recording mode, a signal S8 having a high level is periodically output from the flip-flop 30A when the flip-flop 30A is alternately set and reset, as shown in FIGS. 4D, and this output periodically is input to the counter 31A. The recording signal is input to the counters 31A and 31B through the NOR gate 30C and a inverter 30D. The counter 31A and 31B will operated to count the trailing edges of the recording signal from NOR gate 30C, only if the signal from flip flop 30A is high. Therefore, if the binary signals are periodically generated, the flip flop 30A is not maintained at high so that the counters 31A and 31B cannot count the recording signals.

In the overwrite recording mode, the binary signal is periodically not output. As shown in FIG. 4D, therefore, the output S8 from the flip-flop 30A is kept at high level, and the counters 31A and 31B start counting in accordance with the falling edge of the recording data S11, as shown in FIG. 4E. When the counters 31A and 31B count to the predetermined value, high-level signals are input from the counters 31A and 31B to the NAND gate 31C, and a low-level signal is output from the NAND gate 31C, as shown in FIG. 4F, thus disabling the AND gate 33. As a result, the recording data is not supplied to the driver 28, and the writing by the laser beam is inhibited. Such a recording inhibition state is maintained until the clear signal S12 is output from the system controller 3. Therefore, an overwrite operation can be prevented.

Thus, an overwrite operation is not immediately determined when a component having a small amount of reflected light from the optical disk 1 is detected. Overwrite is determined when the number of components having a small amount of reflected light reaches a predetermined number. Therefore, detection errors or omissions can be significantly suppressed.

In addition, the data contained in a recorded area is destroyed until the predetermined number of components having a small reflection light amount are detected from the optical disk 1. However, the amount of destroyed data is set to fall within a range which allows error correction, and the reliability of the recorded data is not damaged.

Although in the above description it is determined that overwrite occurs when a predetermined number of components having a small amount of reflected light are detected, overwrite may be determined even if the count does not reach the predetermined count. More specifically, as shown in FIG. 6, the counter circuit 31 is not provided, and the output S9 from the detection circuit 30 is directly input to the AND gate 33. More specifically, such a detection circuit 30 has an arrangement shown in FIG. 7. In the circuit shown in FIG. 7, the flip-flop 30A is set at a leading edge of the recording data S11 output from the AND gate 33 and input to the input terminal CP of the flip-flop 30A, and is reset in response to the binary signal S4 input to the input terminal R of the flip-flop 30A from the binary circuit 24 through the inverter 30B. As shown in FIG. 4D, the output S8 from the flip-flop 30A is input to the input terminal D of a second flip-flop 30E through an OR gate 30G as the overwrite detection signal S8. In addition, the input terminal CP of the flip-flop 30E receives the recording signal S11 shown in FIG. 4A through an inverter 30F. In the normal recording mode, since the leading edge of the recording signal shown in FIG. 4A is output in synchronism with the leading edge of the output signal from the flip-flop 30A shown in FIG. 4D, an output from the output terminal Q of the flip-flop 30E is kept at low level. Therefore, the output signal S9 from an inverter 30H obtained by inverting the output from the output terminal Q is kept at high level, and the AND gate 33 is opened. The recording data S10 is supplied to the driver 28, and the laser beam is modulated.

In contrast to this, upon overwriting, since the leading edge of the recording signal shown in FIG. 4A is not in synchronism with the leading edge of the output signal from the flip-flop 30A shown in FIG. 4D, an output from the output terminal Q of the flip-flop 30A goes to high level. Since this output is returned to the input terminal D of the flip-flop 30E through the OR gate 30G, the output from the output terminal Q of the flip-flop 30E is kept at high level. Therefore, the output signal S9 from the inverter 30H obtained by inverting the output from the output terminal Q is kept at low level. The AND gate 33 is disabled, and the recording data S10 is not supplied to the driver 28. After a write inhibition signal is output and a predetermined time period elapses, a reset signal is input from the system controller 3 to the input terminal R of the flip-flop 30E. The flip-flop 30E is reset, and the circuit is returned to its initial state.

Thus, it is determined that overwrite occurs immediately after a component having a small amount of reflected light from the optical disk 1 is detected, and the write operation is inhibited.

As described above, utilizing the fact that the intensity of the recording light beam reflected from a recorded area of the optical disk 1 is different from the intensity of the light beam reflected from a nonrecorded area, the system will detect when an overwrite situates has developed. When the recording light beam reflected by the optical disk 1 is compared with the predetermined threshold level, the light beam is digitized. A pulse having a level below the predetermined level is detected from the binary signal by the detection circuit 30. When the level reaches the predetermined level, it is determined that the area in which information is written is a recorded area, and a write inhibition signal is output to stop the recording operation. In addition, the number of signals below the predetermined level is counted by the counter circuit 31. When the count exceeds a predetermined value, it is determined that the area in which information is written is a recorded area, and a write inhibition signal is output to stop the recording operation. In addition, since it is determined that an overwrite has occurred only after a plurality of reflection light components having a level below the predetermined level are detected, overwrite can be reliably prevented.

A case wherein, e.g., the detection circuit 30 and the counter circuit 31 are operated using the leading and trailing edges of the recording data S10 (S11) has been described in the above embodiment. However, the phases of the recording data S10 (S11) and the reflected light signal S4 change depending on, e.g., the recording method or an arrangement of the waveshaping circuit 32. If an operation timing is properly changed depending on the recording method or the arrangement of the waveshaping circuit 32, therefore, the same effect as in the above embodiment can be obtained.

As has been described above in detail, according to the present invention, there is provided an information recording system which can prevent a detection error or omission and thus reliably prevent overwriting.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for optically recording information in an optical recording medium, comprising:
    recording signal generating means for generating a signal to be recorded;
    optical means for generating a recording light beam modulated in response to the recording signal, and guiding the recording light beam to said optical recording medium;
    means for detecting a reflected light beam from said optical recording medium and converting said reflected light beam into an electrical signal;
    comparing means for comparing the level of said electrical signal from said converting means with a predetermined level to generate a comparison signal if said level of said electrical signal exceeds said predetermined level and a null signal if said level of said electrical signal does not exceed said predetermined level;

detecting means for detecting said null signal with the recording signal to generate an overwrite detection signal;

counting means for counting the number of occurrences of said null signal after the generation of the overwrite detection signal, and generating an inhibition signal after the count reaches a predetermined value; and inhibiting means for inhibiting supply of the recording signal to said optical means in response to the inhibition signal.

2. A system according to claim 1, further comprising:

means for generating a release signal for cancelling the overwrite detection signal and supplying said release signal to said detecting means.

3. A system according to claim 1, wherein said detecting means includes means for comparing the timing of said recording signal and said comparison signals.

4. A system according to claim 1, wherein said detecting means includes means for continuously outputting the overwrite detection signal after said count reaches a predetermined value.

5. A system according to claim 1, wherein said optical means includes a semiconductor laser for modulating the recording light beam in response to the recording signal.

6. A system for optically recording information in an optical recording medium, comprising:

recording signal generating means for generating a signal to be recorded;

optical means for generating a recording light means modulated in response to the recording signal and having a high intensity level, and guiding the recording light beam to said optical recording medium;

means for detecting a reflected light bean from the optical recording medium and converting said reflected light bean into an electrical signal having a high level which corresponds to the high intensity level of the recording beam;

comparing means for comparing the level of said electric signal from said converting means with a predetermined level which is set within a range 2.5/3 to 1.5/3 times of the high level to generate an inhibiting signal if said level of said electrical signal exceeds said predetermined level; and inhibiting means for inhibiting supply of the recording signal to said optical means in response to the inhibiting signal.

7. A system according to claim 6, wherein the predetermined level is set within a range of 0.8 to 0.5 times of the high level.

8. A system according to claim 6, wherein the recording light beam further has a low intensity level and the high intensity level of the recording light beam is substantially set within a range of ten to thirty times of the low intensity level.

9. A system according to claim 8, wherein the high intensity level is substantially set within a range of twenty times the low level.

* * * * *